Figure 9:
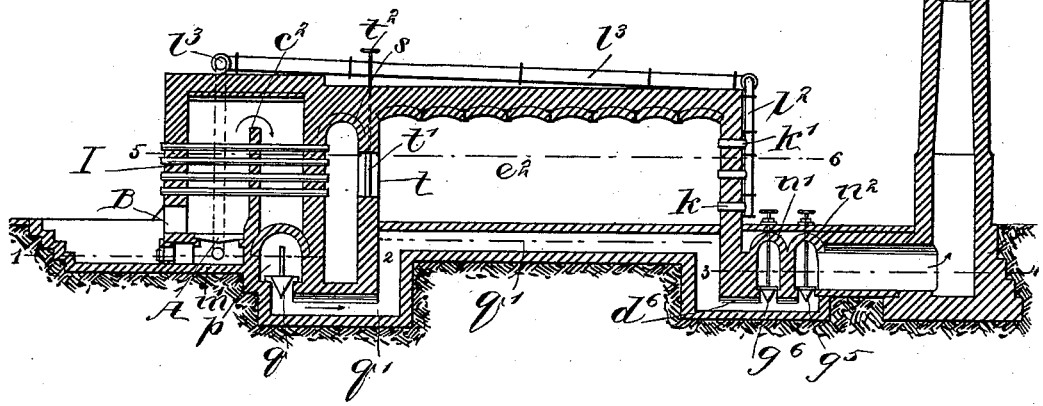

(No Model.) 3 Sheets—Sheet 1.
A. RÜBENKAMP.
APPARATUS FOR DRYING RAW OR PREPARED GOODS.
No. 528,807. Patented Nov. 6, 1894.
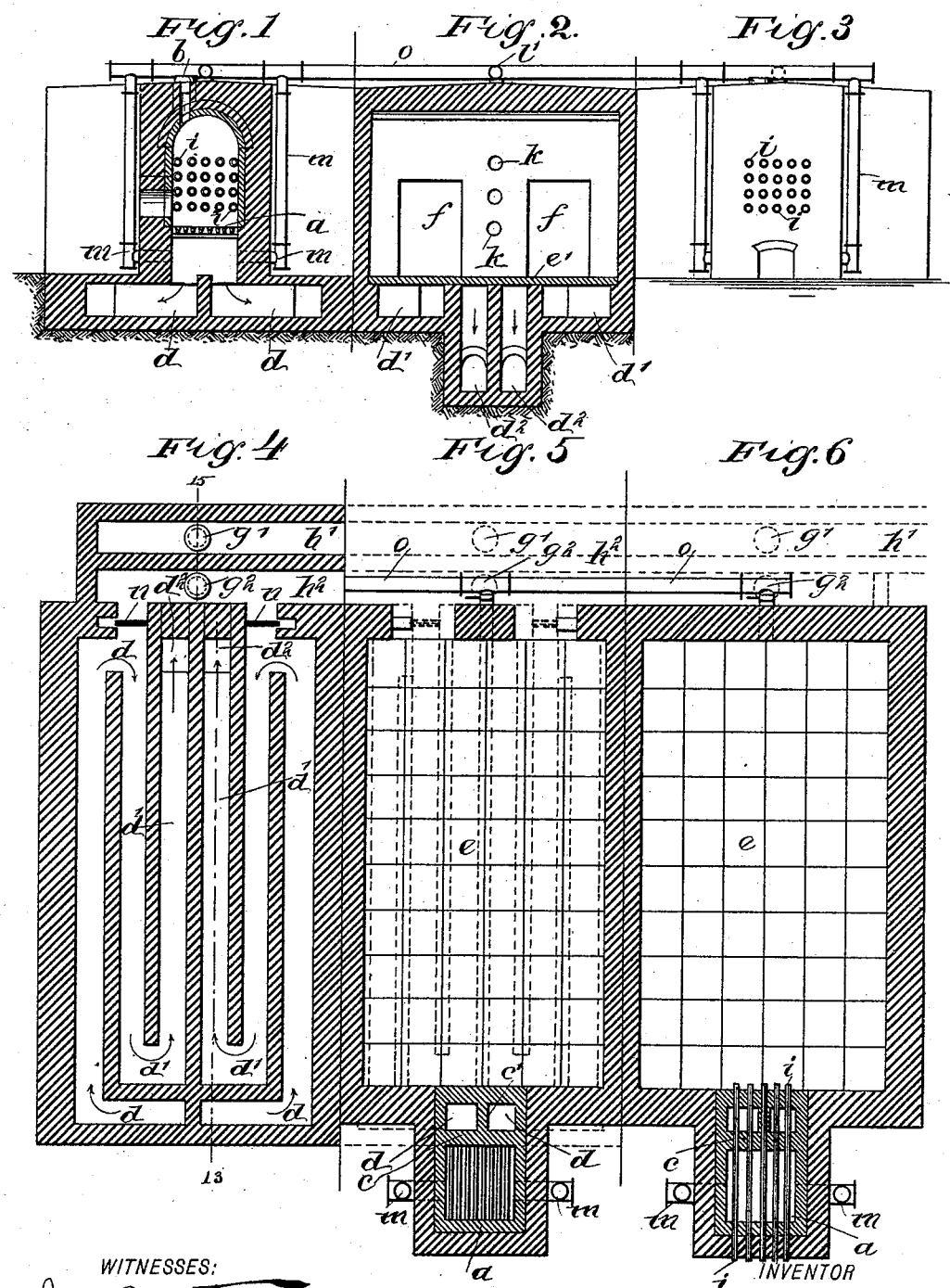
WITNESSES:
J. A. Bergstrom
C. Sedgwick
INVENTOR
A. Rubenkamp
BY Munn & Co.
ATTORNEYS.

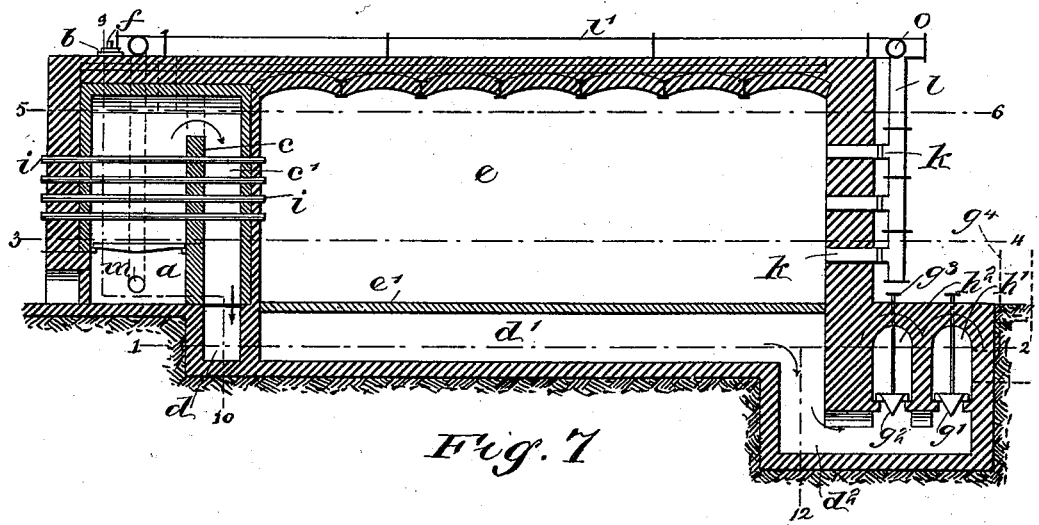
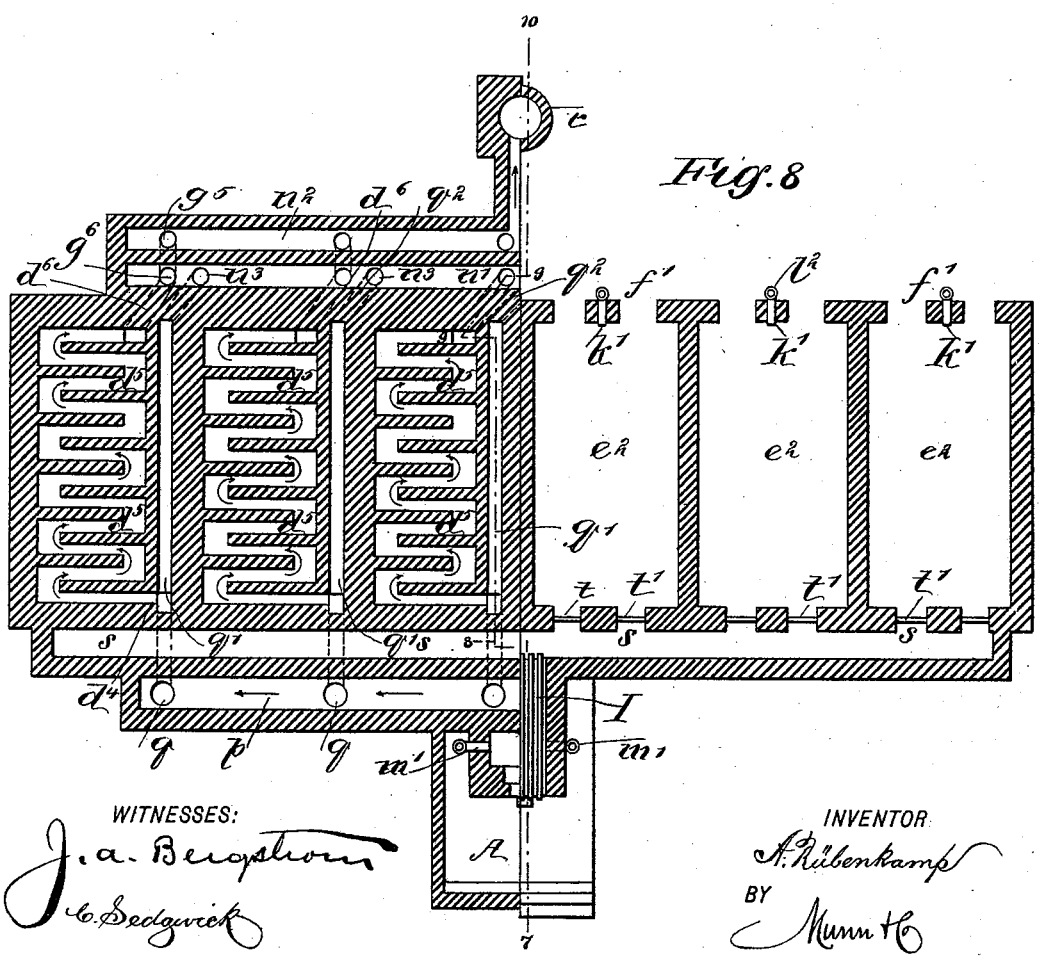

(No Model.) 3 Sheets—Sheet 3.

A. RÜBENKAMP.
APPARATUS FOR DRYING RAW OR PREPARED GOODS.

No. 528,807. Patented Nov. 6, 1894.

WITNESSES:

INVENTOR

UNITED STATES PATENT OFFICE.

AUGUST RÜBENKAMP, OF DORTMUND, GERMANY.

APPARATUS FOR DRYING RAW OR PREPARED GOODS.

SPECIFICATION forming part of Letters Patent No. 528,807, dated November 6, 1894.

Application filed August 16, 1892. Serial No. 443,223. (No model.) Patented in Switzerland February 28, 1892, No. 5,414; in England May 26, 1892, No. 9,992; in France June 2, 1892, No. 222,089; in Belgium August 1, 1892, No. 100,780; in Denmark August 4, 1892, and in Austria-Hungary August 26, 1893, No. 544 and No. 9,557.

*To all whom it may concern:*

Be it known that I, AUGUST RÜBENKAMP, engineer, of Dortmund, in the Kingdom of Prussia, German Empire, have invented a new and useful Apparatus for Drying Raw or Prepared Goods, (for which Letters Patent have been granted to me in France, No. 222,089, dated June 2, 1892; in England, No. 9,992, dated May 26, 1892; in Austria-Hungary, No. 544 and No. 9,557, dated August 26, 1893; in Belgium, No. 100,780, dated August 1, 1892; in Switzerland, No. 5,414, dated February 28, 1892, and in Denmark, dated August 4, 1892,) of which the following is a specification, reference being had therein to the accompanying drawings.

The objects of this invention are first, to avoid the great loss of heat, arising when the products of combustion and the hot drying air are allowed to escape directly into the atmosphere, and, secondly, to allow of a gradual warming and cooling of the goods under treatment.

Reference is to be had to the accompanying drawings, forming a part of this specification, in which similar letters of reference indicate corresponding parts in all the figures.

Figures 1, 2 and 3 are views of three connected apparatuses, Fig. 1 showing one such in vertical section on the line 9—10 of Fig. 7, Fig. 2 showing the second of the connected apparatuses on the line 11—12 of Fig. 7, and Fig. 3 showing the third apparatus in front elevation. Figs. 4, 5 and 6, are horizontal sections through such apparatuses, Fig. 4 showing one such on a line corresponding to line 1—2, Fig. 7, Fig. 5 showing the second on a line corresponding to line 3—4, Fig. 7, and Fig. 6 showing the third one on a line corresponding to line 5—6, Fig. 7. Fig. 7 is a vertical longitudinal section on the line 13—15, Fig. 4. Fig. 8 is a sectional plan view, the right side of the center line being taken through the drying chambers, as indicated by line 5—6, Fig. 9, and the left side of the center is taken on the line 1, 2, 3, 4. In this figure, the lower part of the apparatus is omitted from the right of the figure in the interest of clearness. Fig. 9 is a longitudinal central vertical section through the apparatus, as indicated by line 7, 8, 9, 10, Fig. 8.

The heated air which serves to dry the goods, is after passing through the drying chamber, brought back to the closed furnace, where it serves to effect combustion of the fuel. The products of combustion, and the air which passes through the drying chamber and the various tubes and channels for the purpose of heating the apparatus, instead of being conducted directly to the chimney, may be first passed through the heating tubes and channels of a second apparatus in order to bring the same into a state ready for the commencement of the drying process.

Referring especially to Figs. 1 to 6, each drying chamber $e$ has its separate furnace $a$, to which fuel may be supplied through openings at the top provided with covers $b$. Leading from each furnace $a$ at the back of its bridge $c$, are serpentine channels $d$, $d'$, below the floors $e'$ of the drying chambers $e$, the products of combustion being divided by the partition $c'$ back of the bridge wall $c$. The portions $d'$ of such serpentine channels lead in a downward and rearward direction as at $d^2$, to a point beneath conduits $h'$, $h^2$, which extend longitudinally at the rear of the apparatus, communication between the outlets $d^2$ of the serpentine channels and either the conduits $h'$ $h^2$ being established by means of valves $g'$, $g^2$, which are operated by the valve rods $g^3$. (Fig. 7.) The conduits $h'$ lead to a chimney $g^4$ (indicated by dotted lines in Fig. 7) or other exhaust, while the conduits $h^2$, may be made to communicate with the portions $d'$ of the serpentine channels $d$, $d'$, by means of dampers $n$.

In each furnace $a$, air pipes or tubes $i$ are fitted, and are open at their front ends for the admission of atmospheric air, their inner ends opening into the drying chamber $e$ to deliver air thereto. From the rear of each chamber $e$ outlet pipes $k$ lead to a vertical pipe $l$ connected with the pipe $l'$, which is extended forwardly on the top of the furnace, and is connected at the front with the downwardly extended pipes $m$, which latter in turn deliver to the furnace $a$, such furnace being otherwise closed. The pipes $l$ of the several drying chambers $e$ are united by connecting pipes $o$. (Figs. 5 and 7.)

Each drying chamber $e$ is provided with doors $f$, through which the goods to be dried are inserted and removed. When using only one chamber $e$, the operation is as follows: The hot gases from the furnace $a$ pass over the bridge wall $c$, and dividing, pass through the channels $d$, $d'$, $d^2$ beneath the heating chamber $e$, and the valve $g'$ being opened, the gases pass to the conduit $h'$ and to the chimney $g^4$. At the same time, air enters the chamber $e$ through pipes $i$, and, with the moisture driven off from the goods, passes out through outlet pipes $k$, and through pipes $l$, $l'$, and $m$, to the furnace.

When the three drying chambers are in use, fire is lighted in the furnace $a$ of the first chamber, and the valve $g'$ of the first furnace is closed, and the valve $g^2$ opened, the dampers $n$ of the second apparatus are opened, together with the valve $g'$ of such second furnace, while the adjacent valve $g^2$ is closed. The gases will now, after passing through channels $d$, $d'$, $d^2$, of such first furnace enter conduit $h^2$ through first valve $g^2$, from conduit $h^2$, through the dampers $n$ of the second apparatus into the channels $d'$ of the latter, out through valve $g'$ of such second apparatus, and thence to conduit $h'$, and to the chimney. This passage of the gases from the first furnace beneath the second heating chamber, gives the goods in the latter a preliminary heating, and the aqueous vapor from the second chamber passes from the latter, through the pipes $k$ of such second chamber and commingles in pipes $l$ and $o$ with the vapor from the first chamber $e$, and passes to the furnace of the first chamber through the pipes $m$ of the latter. The goods in the first chamber having been sufficiently dried, the fire in the first furnace is allowed to die out or is extinguished, and the fire in the second furnace is lighted. The valve $g^2$ of the first furnace is closed and the valve $g'$ opened, whereby cool air will enter the first chamber, pass through the same, out through pipes $k$, $l$, $m$, through the furnace to channels $d$, $d'$, $d^2$, and out through valve $g'$, and conduit $h'$ to the chimney, thus cooling the goods in the first chamber. At the same time the valve $g'$ of the second apparatus is closed and its valve $g^2$ opened, and also the dampers $n$ leading to the third apparatus is opened, while the dampers of the second apparatus are closed. Thus, the gases from the second furnace after passing beneath the second drying chamber will pass beneath the third, in the same manner as described with respect to the first and second.

Referring to Figs. 8 and 9, the apparatus includes a single furnace A, having fuel opening B, for heating a series of drying chambers, six being shown. At the back of the furnace is a longitudinal chamber $p$, to which the hot gases pass over bridge wall $c^2$, and from the said chamber lead a series of valved outlets $q$, each of which communicates with a longitudinal channel $q'$ beneath the drying chamber $e^2$, the opposite end of which channel $q'$ leads by a passage $q^2$, through valved outlets $n^3$ to longitudinal conduit $n'$ at the back of the apparatus. Near the front end of the conduit $q'$ it has communication, as at $d^4$, with the serpentine channel $d^5$ ranging beneath the drying chamber $e^2$, the opposite end of such serpentine channel $d^5$ leading to a passage $d^6$, which extends beneath the rear conduit $n'$ and a second parallel conduit $n^2$, the passage $d^6$ being adapted to communicate with either conduit $n'$ or $n^2$ through valves $g^5$, $g^6$. The conduits $n'$, $n^2$, correspond with the conduits $h^2$, $h'$, of the other figures, the conduit $n^2$ leading to chimney $r$.

In the furnace A, a series of air inlet pipes I are fitted, through which atmospheric air enters to a common chamber $s$, and in the rear wall of the chamber $s$, openings $t$ are made into the several drying chambers $e^2$ the openings being closed by dampers $t'$ having operating rods $t^2$.

The pipes $k'$ and $l^2$ are the same in all respects as the corresponding pipes in the other figures, except that they lead to a common forwardly extending pipe $l^3$ which delivers to the furnace by pipes $m'$.

With this apparatus, the gases enter the chamber $p$, and may be directed to the channels beneath any desired drying chamber or drying chambers. The gases may be directed beneath one chamber and then to the chimney, or successively through any two or more and then to the chimney. Thus, when the valves $g^5$, $n^3$, of the first chamber are closed, the first valve $g^6$ opened, and the valve $g^6$ of the second chamber closed and the valves $n^3$, $g^5$ of such second chamber opened, the gases will pass through the serpentine passages $d^5$ of the first chamber, through the first valve $g^6$, to conduit $n'$, through the second valve $n^3$, into the second channels $q'$, $d^5$, and out through the second passage $g^6$, and valve $g^5$ to conduit $n^2$ and to the chimney.

Doors $f'$ are provided for chambers $e^2$, for the entrance and removal of the goods.

Having thus described my invention, I claim as new and desire to secure by Letters Patent—

1. A drying apparatus comprising a series of drying chambers, each having channels beneath the same, a source of heat connected with such channels, two conduits with which the channels are connected, valved outlets from each of the channels to both conduits, and a controlled inlet from one of such conduits to the channels, substantially as described.

2. A drying apparatus comprising a series of drying chambers having each serpentine channels beneath the same a heat generator delivering its gases to the said channels, conduits to which the serpentine channels lead, valved outlets from the channels to each of the conduits, controlled inlets from one of the conduits to the channels, air inlet pipes to the drying chambers, outlets to the drying chambers, and connections between the said outlets and the generator, substantially as described.

3. A drying apparatus comprising a series of drying chambers, a furnace, a hot air chamber common to all the drying chambers, air inlet pipes fitted in the furnace and delivering to the hot air chamber, controlled inlets from the hot air chamber to the drying chambers, channels beneath the drying chambers, a receiving chamber for the gases of the furnace, such receiving chamber being common to the channels of the drying chambers, and connections between the outlets of the several channels, substantially as described.

In witness whereof I hereunto set my hand in presence of two witnesses.

AUGUST RÜBENKAMP.

Witnesses:
   CHR. SONNENSCHEIN.
   A. KLINGHAMMER.